(12) United States Patent
Liu et al.

(10) Patent No.: US 11,079,324 B2
(45) Date of Patent: Aug. 3, 2021

(54) SPECTROMETER WITH WIDE-SCAN TUNABLE DIODE LASER

(71) Applicant: SpectraSensors, Inc., Rancho Cucamonga, CA (US)

(72) Inventors: Xiang Liu, Rancho Cucamonga, CA (US); Alfred Feitisch, Los Gatos, CA (US); Gary Yeh, Rancho Cucamonga, CA (US); Chih-Hsuan Chang, Fontana, CA (US)

(73) Assignee: SpectraSensors, Inc., Rancho Cucamonga, CA (US)

(*) Notice: Subject to any disclaimer, the term of this patent is extended or adjusted under 35 U.S.C. 154(b) by 0 days.

(21) Appl. No.: 16/511,429

(22) Filed: Jul. 15, 2019

(65) Prior Publication Data
US 2021/0018433 A1    Jan. 21, 2021

(51) Int. Cl.
*G01N 21/39* (2006.01)
*G01N 21/01* (2006.01)

(52) U.S. Cl.
CPC .......... *G01N 21/39* (2013.01); *G01N 21/01* (2013.01); *G01N 2021/399* (2013.01)

(58) Field of Classification Search
CPC . G01J 3/42; G01J 3/427; G01N 21/31; G01N 21/39; G01N 21/3103; G01N 2021/3129; G01N 2021/3196; G01N 2021/399
See application file for complete search history.

(56) References Cited

U.S. PATENT DOCUMENTS

| | | | |
|---|---|---|---|
| 8,976,358 B2 | 3/2015 | Feitisch et al. | |
| 9,671,333 B2 | 6/2017 | Hirata et al. | |
| 10,330,592 B2 | 6/2019 | Koulikov | |
| 2010/0259752 A1* | 10/2010 | Shah | B82Y 20/00 356/300 |
| 2011/0032516 A1* | 2/2011 | Zhou | G01N 21/39 356/73 |
| 2013/0135619 A1* | 5/2013 | Hirata | G01N 21/3504 356/409 |

(Continued)

FOREIGN PATENT DOCUMENTS

EP    2597456 B1    11/2017

*Primary Examiner* — Dominic J Bologna
(74) *Attorney, Agent, or Firm* — Kelly J. Smith; Endress+Hauser (USA) Holding Inc.

(57) ABSTRACT

A method for implementation by a laser spectrometer is provided. The method includes first scanning, by a control unit using a first set of laser spectrometer operating parameters, a first wavelength range by adjusting a wavelength of light of a beam emitted by a laser light source and passing through a sample gas. The first wavelength range encompasses a first spectral feature corresponding to a first constituent. The method also includes at least one second scanning, by the control unit using a second set of laser spectrometer operating parameters, a second wavelength range by adjusting the wavelength of light emitted from the laser light source and passing through the sample gas. The second wavelength range has a second spectral feature corresponding to at least one second constituent. The control unit also determines a first concentration of the first constituent and a second concentration of the at least one second constituent.

21 Claims, 8 Drawing Sheets

(56) References Cited

U.S. PATENT DOCUMENTS

2016/0132617 A1    5/2016  Liu et al.
2019/0195784 A1*   6/2019  Taniguchi ............... G01J 3/108
2019/0317013 A1*  10/2019  Weidman .................. G01J 3/08

* cited by examiner

SPECTROMETER WITH WIDE-SCAN TUNABLE DIODE LASER

TECHNICAL FIELD

The subject matter described herein relates to a spectrometer having a tunable laser light source with wide scanning ability. Such a spectrometer may be usable for analyzing a sample (e.g. a fluid sample containing a gas and/or a liquid).

BACKGROUND

Spectrometers can use emission, absorption, or Raman scattering of light by matter to qualify and quantify specific atoms and molecules in analysis of gas, solid, or liquid phase compounds. In the case of emission spectroscopy, light emitted by atoms in an excited state can be detected and analyzed to determine the composition of an analyte based on known optical transitions occurring within the atoms, ions or molecules of an analyte. In the case of absorption spectroscopy, energy from light passing through a sample volume containing a gas or liquid sample is absorbed by the analyte, putting the absorbing atoms or molecules into an excited state. Spectral analysis of the light that is not absorbed can then be used to infer the presence and/or quantity (e.g. concentration, partial pressure, mole fraction, etc.) of an analyte in the sample. In the case of Raman spectroscopy, light scattered by matter contains spectral components which are created by Raman scattering, corresponding to certain particular transitions in molecules or ions. For example, in infrared absorption spectroscopy, discrete energy quanta are absorbed by molecules due to excitation of vibrational or rotational transitions of the intra-molecular bonds.

SUMMARY

In one aspect, a method for implementation by a gas spectrometer including a laser light source, a control unit, and at least one detector is provided. The detector is positioned such that light emitted by the laser light source is detected by the at least one detector after passing through a sample gas. The method includes first scanning, by the control unit using a first set of laser spectrometer operating parameters, a first wavelength range by adjusting a wavelength of light of a beam emitted by the laser light source and passing through the sample gas. The first wavelength range encompasses a first spectral feature corresponding to a first constituent. The method also includes at least one second scanning, upon completion of the first scanning and by the control unit using a second set of laser spectrometer operating parameters at least partially different from the first set of laser spectrometer operating parameters, a second wavelength range by adjusting the wavelength of light emitted from the laser light source and passing through the sample gas. The second wavelength range has a second spectral feature corresponding to at least one second constituent. The method further includes determining, by the control unit, based on the first scanning and the at least one second scanning, a first concentration of the first constituent and a second concentration of the at least one second constituent.

Implementations of the current subject matter can include, but are not limited to, methods consistent with the descriptions provided herein.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a wide-wavelength scanning tunable diode laser spectrometer, it should be readily understood that such features are not intended to be limiting. The terms "sample gas volume", "gas volume", "sample liquid volume" and "liquid volume" as used herein therefore refers to either a flowing volume or a static, batch volume of gas or liquid (as the case may be). The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
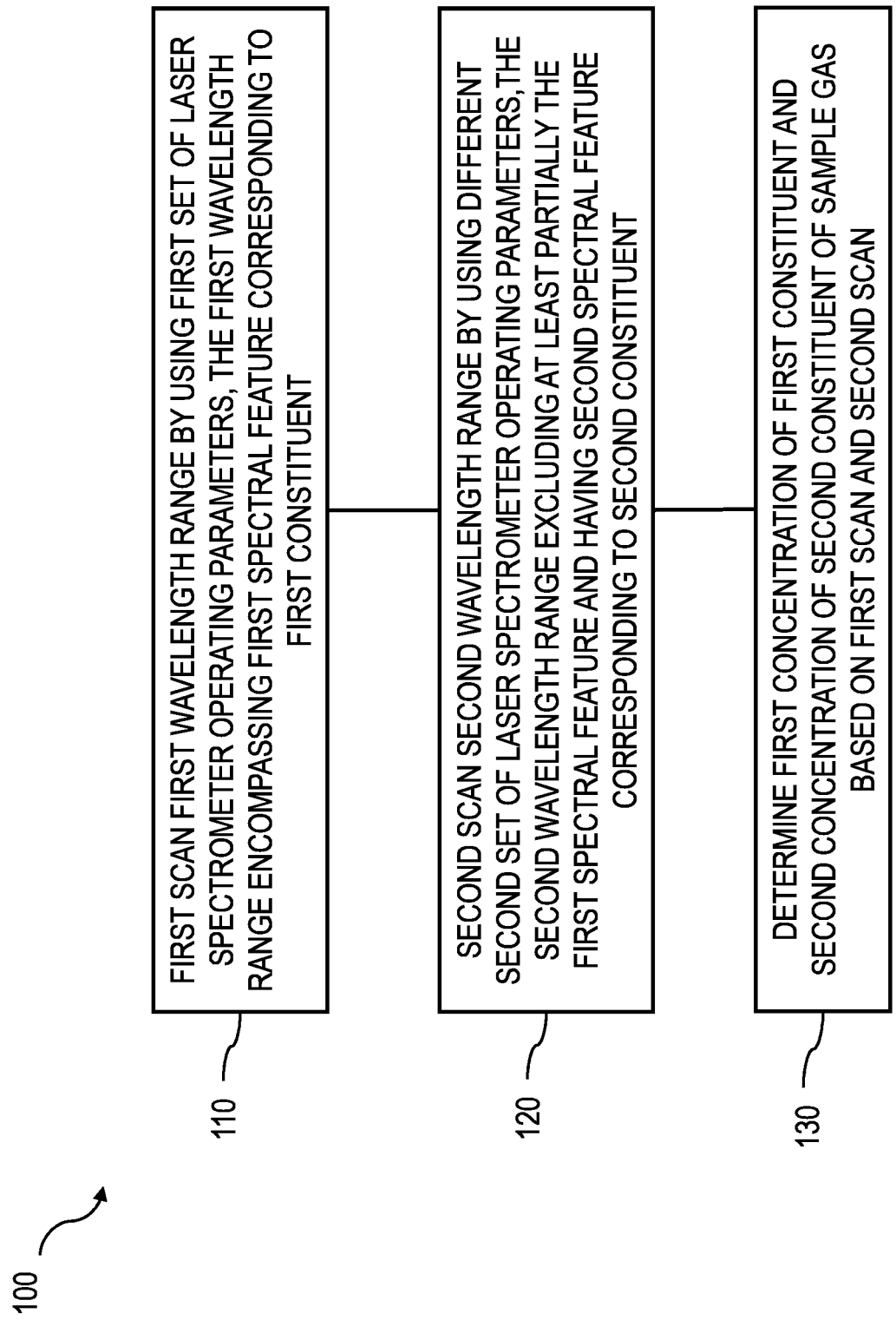
FIG. 1 is a process flow diagram illustrating detection of multiple constituents by scanning multiple wavelength ranges with a gas spectrometer.

The subject matter described herein is directed to spectrometers, and more particularly gas spectrometers, and related techniques for discriminating among multiple analytes by using a light source such as a tunable semiconductor laser, including, but not limited to, a diode laser and/or a quantum cascade laser and/or an intra band cascade laser. The subject matter described herein takes into account that the spectral response measured by spectrometers is different for each analyte and that measurable spectral features (either for two or more target analytes or for a same analyte if more than one spectral feature is measured to characterize that analyte, e.g. in Raman spectroscopy or the like) are not necessarily close to each other, or conveniently so, in wavelength space. Spectrometers, control systems, and/or related techniques consistent with implementations of the current subject matter may provide one or more technical advantages as detailed below, and such advantages may provide solutions or improvements relevant to one or more technical challenges presented by currently available technologies. For example, a typical spectrometer that includes a tunable laser light source may be significantly limited in its ability to provide wavelengths separated by more than the spectral width of an analyte spectral feature in wavelength space without introducing significant uncertainty in the concentration quantification of the spectrometer, with respect to its calibration state. Implementations of the current subject matter allow use of a spectrometer over significantly greater ranges of provided wavelength, which can enable analysis of multiple spectral features in a single pass over one or more scan ranges. Rather than requiring factory re-calibration of the spectrometer to tune it for analysis of spectral features occurring at different wavelengths that are not captured in an originally configured wavelength range, a spectrometer configured consistent with implementations of the current subject matter can include stored parameter sets that are implemented to dynamically adjust multiple operating parameters of the spectrometer to provide a well-characterized (with respect to state of calibration) spectral response over whatever range or ranges are needed to analyze one or more analyte concentrations based on multiple spectral features.

The current subject matter can be employed with a variety of sample fluids including gases and/or liquids containing one or multiple analytes. Illustrative but non-limiting examples of sample fluids that can be analyzed consistent with implementations of the current subject matter include natural gas and/or gases occurring in a cracking furnace, in chemical reactors for ethylene production, and/or similar or analogous chemical processes, including but not limited to alkanes, alkenes, alkynes, cyclo-hydrocarbons, ammonia, moisture, CO, $H_2$ and the like. Natural gas can include concentrations of $H_2O$, $CO_2$, and $H_2S$ in addition to the primary hydrocarbon components. The current subject matter may enable multiple combinations of absorption lines, (for example, within a natural gas sample) corresponding to one or more analyte species, optionally with significantly different concentration ranges and/or spectral responsiveness, to be detected and/or quantified with a single light source (e.g., a tunable diode laser, etc.). Detection and quantification of multiple spectral features can be made by changing parameters such as the absorption wavelength, and/or the wavelength modulation, laser injection current ramp, signal detection gain and/or a phase, and the like, which are generally set during spectrometer calibration for accurate measurement of one analyte species.

The current subject matter may also provide one or more additional technical advantages. One such potential advantage involves an ability to account for and correct non-linear effects that can distort the recorded spectra and result in errors in gas concentration measurements, with respect to a calibration state of a spectrometer. Such non-linear effects can become important when scanning over a wide spectral range of more than one spectral feature contained in the sample gas to determine concentrations of multiple analytes. Furthermore, typical semiconductor lasers used in tunable diode laser (TDL) spectrometers can be limited to an injection current driven scan range of less than approximately 0.5 nm to 1 nm, requiring a change in the semiconductor laser operating temperature to scan spectral features of multiple analytes in a sample gas over a wider wavelength range than can be covered by a single injection current scan. It will be understood that the width of a spectral feature of a molecule in a sample gas can be expressed in wavenumbers ($cm^{-1}$). As an example, at approximately atmospheric sample gas pressure, typical molecular spectral features can have a width of less than approximately 0.2 $cm^{-1}$. Spectra recorded during a semiconductor laser scan are typically linear with the injection current, but non-linear on a frequency scale. There are several reasons for this. First, wavelength scanning of a semiconductor laser is inherently a thermal process related to the power dissipated in the laser, which, by Ohm's law, is a quadratic function of the injection current. For semiconductor lasers with p-n junctions, the electrical forward current resistance is also non-linear and temperature dependent, adding more non-linearity to the wavelength shift caused by an injection current ramp. Second, temperature changes in the quantum well change the index of refraction of the semiconductor, also in a non-linear manner. Third, temperature changes also change the grating period of a DFB or DBR type semiconductor laser, which defines the lasing frequency as a function of the linear thermal expansion and the effective index of refraction. Fourth, thermal effects can result in other quantum mechanical effects in the quantum well itself, altering the behavior of charge carriers in the p-n junctions. Thus, the combination of all these non-linear effects distorts the actual operation of the laser away from the ideal frequency linear operation desirable for a spectral scan. Furthermore, it will be understood that due to the described non-linear nature of the spectral scan distortion, the distortion will change with laser operating temperature and current scan range over time. Changing the central wavelength of the laser scan by changing the semiconductor laser operating temperature can distort the spectral scan from time of calibration and cause offsets against the state of calibration of the TDL spectrometer. In addition, aging of the laser and/or the electronic circuitry and/or the optical system will typically shift and distort the spectral scan from time of calibration and cause offsets against the state of calibration of the TDL spectrometer.

Distortion of the spectral response of a spectrometer within a wavelength scan relative to an "original" or "calibrated" state of the spectrometer can lead to significant challenges in maintaining accuracy of low concentration quantification techniques, for example for detection and quantification of amounts of target analytes within sample fluids that also contain complex, not well characterized, or temporally variable background concentrations of other compounds that may interfere or overlap with analysis of a target analyte. Distortion generally refers to a compression or expansion of one or more features of an electromagnetic emission profile of the tunable light source during a scan of a wavelength range relative to the calibrated state, and can occur due to a number of factors including aging of a semiconductor laser, which can cause an operating point (e.g. the temperature and/or center current) of a given wavelength scan to change. Additional factors that can potentially exacerbate spectral distortion include heat driven wavelength changes of a semiconductor laser, especially when combined with the non-linear (with changing temperature) electrical resistance of a typical p-n junction semiconductor laser.

Implementations of the current subject matter relate to approaches by which such distortion may be compensated for, either during a scan to cause the scan to replicate a "known" calibration state of the spectrometer or after a scan during data processing of the resultant spectral data reflective of light intensity received at one or more detectors after the emitted light passes at least once through a sample volume continuing a sample fluid. Compensation during a scan can be achieved by adjusting one or more laser spectrometer operating parameters of the spectrometer, such as various temperature, current, voltage, etc. states of a tunable laser light source, dynamically throughout a wavelength scan to cause the tunable light source to emit light with a wavelength response relative to a scan-driving parameter that matches a calibration state (which is typically a laser injection current, but may alternatively be temperature or some other variable parameter of the spectrometer). Compensation after a scan may include applying one or more correction algorithms to correct for scan variability caused by the factors noted above.

Moreover, a synergistic advantage possible due to the ability of the current subject matter to provide multiple analyte measurements with a single spectrometer operating over one or more scan ranges for a single sample volume involves calculating and compensating for collisional broadening and changes in gas stream composition, especially in harmonic spectroscopy, including evaluation of the molecular spectrum at the $2^{nd}$ or higher and/or lower order harmonic of a modulation frequency of the wavelength scanning laser. Collisional broadening describes the impact of collisions of the analyte molecules with any molecules in the gas stream, not limited to self broadening, such as from pressure and/or temperature changes of the gas stream. In contrast to self broadening, collisions with non-analyte molecules in the gas stream can have a very different impact on the analyte spectral signature, depending upon the colliding molecules' structure and mass. Collisional broadening is discussed in greater detail in U.S. Pat. No. 7,586,094 to Xiang Lu et al., U.S. Pat. No. 8,976,358 to Alfred Feitisch et al., and U.S. Pat. No. 9,618,391 to Alfred Feitisch et al., the contents of which are hereby incorporated by reference.

Compensation of collisional broadening impact from gas stream changes improves calibration accuracy, robustness, field deployability, and reduces calibration cost. Collisional broadening effects can cause offsets to the calibration of an analyte concentration measurement. Offsets due to collisional broadening can occur as a result of uncorrected collisions either when a type or concentration of an analyte is unknown or poorly known, or when stream composition changes. By performing multiple analyte measurements as provided herein, the effects of collisional broadening, even across changes in gas stream composition, can be compensated for when determining analyte concentrations.

The current subject matter can compensate for spectral absorption from stream components other than the measured analyte during measurement of low analyte concentration levels in hydro- (and other) carbon gases. Especially under conditions of approximately atmospheric gas pressure measurement, there will always be residual spectral interference, which will cause an offset in the measurement when the gas stream changes from the calibration gas stream. Measuring under approximately atmospheric gas pressures offers significant advantages, reducing complexity, cost and maintenance issues for vacuum based measurements. Vacuum pumps especially are expensive to acquire and maintain. For example, $H_2O$ concentration measurements can experience significant offset from $CO_2$ concentration changes in a natural gas stream. Ethane concentration changes can also impact the $H_2O$ concentration measurement, albeit at a somewhat lesser magnitude. The same is true for $H_2S$ measurements. This effect is not as pronounced for $CO_2$, mainly due to its generally very high relative concentration in natural gas pipelines. It will be understood that the impact described for $H_2O$, $CO_2$ and $H_2S$ in natural gas, also occurs in any mixture of multiple hydro-carbons and other gases. As an example, the ability to compensate for stream composition changes is also absolutely necessary when controlling acetylene within concentration levels of 5 ppm in a front end cracker of an ethylene production train. In such a cracker, gas composition will change unpredictably as a result of the steam interaction with crude oil and especially as a result of the source of the crude oil.

As can be appreciated from the above, the capability of a spectrometer (e.g., a TDL spectrometer, etc.) to be able to automatically correct its spectral output (e.g., with respect to a state of calibration) and to dynamically provide one or multiple scanning ranges (e.g., that include spectral features potentially separated by substantial gaps in wavelength space) in a single pass, by measuring multiple analytes (or multiple spectral features of a single analyte) with a single system using a single light source (e.g. a tunable semiconductor laser) as described above results in a number of advantages. Implementations of the current subject matter include spectrometers having wide-scan range capabilities that would otherwise require multiple separate analytical systems using currently available approaches, and can therefore be significantly less expensive (both in terms of capital cost and ongoing maintenance) and require substantially less hardware space. Further, with the current subject matter, measurements are more accurate and robust against stream composition changes. Instrument calibration may be simplified and made more inexpensive by reducing the need to run multiple calibration reference gases due to the ability of the spectrometer to self-correct for spectral distortions caused by one or more of the factors discussed herein. It is also less expensive than using stream concentration data for calibration offset compensation, for example, from Raman instruments, gas chromatography, etc.

In addition to the advantages identified above, the current subject matter is advantageous in that it obviates the requirement for separate sets of electronics, detectors, lasers, sample cells, and the like, to measure each analyte at low concentrations (such as those typically required by government-regulated natural gas systems). Further, the current subject matter provides the ability to perform multiple analyte measurements from a single set of hardware, including a single light source, which, in turn, can allow for a more compact hardware footprint and greatly reduce overall costs for hardware and measurements.

FIG. 1 is a process flow diagram illustrating detection of multiple constituents by scanning multiple wavelength ranges with a spectrometer. The spectrometer can include a light source, a control unit, and at least one detector positioned such that light emitted by the light source is detected by a detector after passing through a sample gas. The sample gas can contain multiple constituents at trace levels (for example at ppb to less than approximately 1000 ppm concentration levels, including but not limited to $H_2O$ or $H_2S$ in a natural gas sample), or at higher levels (for example concentrations of greater than approximately 1000 ppm to 100%, including but not limited to $CO_2$ and/or ethane $C_2H_6$ and/or methane $CH_4$, in natural gas sample).

The determination of constituents in the sample gas can be performed by performing multiple measurement scans over wavelength ranges that contain particular spectral features of the sample gas constituents. The spectral features can, for example, correspond to absorption, emission, or scattering of light from the light source as it passes through the sample gas. The spectral features can be analyzed in order to determine concentrations of the constituents. In some implementations, one or more laser spectrometer operating parameters of the light source can be optimized to allow accurate measurements in a particular wavelength range. In some cases, the light source may not be able to scan over each wavelength range without such laser spectrometer operating parameters being changed in order to ensure calibration fidelity. Details of the optimization of the parameters in order to measure concentrations of multiple constituents are described below.

A wavelength scan can include adjusting the wavelength of light emitted by the light source in order to observe changes in measurement response by a detector. For example, when scanning a particular wavelength range where constituents in the sample gas absorb the light, a signal drop can be detected. The shape and amplitude of these spectral features of the constituents can be measured during the scan.

When performing a wavelength scan, one or more laser spectrometer operating parameters, for example, a laser drive current, a modulation current, a ramp current, a signal detection gain & phase can be optimized. The laser drive current can primarily determine the output wavelength of the light from the light source. The modulation and/or ramp current can be, for example, a current with a certain waveform that leads to controlled variation in the wavelength and intensity of the light from the light source. The gain can be, for example, a parameter that is used to adjust the signal or the signal demodulated by the lock-in amplifier for semiconductor laser spectrometers based on wavelength modulated spectroscopy (WMS). The phase can be a parameter that is used to maximize the demodulation output of the lock-in amplifier of a WMS based laser spectrometer. The optimization of one or more laser spectrometer operating parameters can be performed to allow optimal detection of a spectral feature that can be used to determine a concentration of a constituent, maintaining calibration fidelity.

As used below and herein, the terms "first" and "second" are not intended to specify a particular sequence of scans, spectral features, constituents, concentrations, etc. The terms "first" and "second" are intended only to distinguish one element or action from another. For example, scans can be performed in any order, contain any number of smaller scans, and cover an arbitrary wavelength range.

Also, as used herein, the term "concentration" can include a relative concentration (for example, ppm or fractional amounts, mass concentration, molar concentration, number concentration, volume concentration) or absolute amounts (for example, mass, number, volume).

As shown in FIG. 1, at 110, there can be a first scanning by the control unit using a first set of laser spectrometer operating parameters, of a first wavelength range by adjusting a wavelength of light of a beam emitted by the light source and passing through the sample gas. This first scanning can encompass a first spectral feature corresponding to a first constituent of the sample gas.

At 120, upon completion of the first scanning, there can be a second scanning of a second wavelength range by the control unit using a second set of laser spectrometer operating parameters. The second wavelength range can, in some cases, partially overlap the first wavelength range or have no overlap with the first wavelength range. The second wavelength range can include at least one second spectral feature that corresponds to a second constituent. Alternately, the second wavelength range can correspond to a spectral feature of the first constituent, which exhibits a different reaction to collisions with other stream components and/or temperature and/or pressure. However, in some cases, the second wavelength range excludes the first spectral feature. Further, there are cases in which only one scan is performed, but scan parameters are adjusted during the one scan.

The second scanning can be performed by adjusting the wavelength of light emitted from the light source and passing through the sample gas. The wavelength of light from the light source can be adjusted by changing at least one of the laser spectrometer operating parameters and/or its heat sink temperature. This can result in a second set of laser spectrometer operating parameters that are partially different from the first set of laser spectrometer operating parameters and optimized to measure the second spectral feature. For example, during the first scan, the wavelength of the light from the light source may change as a first non-linear function of the drive current, representing the heat generation in the pn-junction changing with the drive current. Because the absorption spectrometer has been calibrated for this first non-linear wavelength function of the laser drive current, the first spectral feature can be measured accurately. However, continuing adjustment of a semiconductor laser drive current and/or a ramp current to scan a second wavelength range may introduce a non-linear wavelength scanning function of the laser drive current, which is different from the first non-linear wavelength function, to which the spectrometer has been calibrated, resulting in an inaccurate measurement. To correct for this, a second set of laser spectrometer operating parameters may need to be adjusted. In this example, by independently adjusting one or more of the temperature, the drive current, the modulation current, the ramp current, the signal detection gain and/or the phase, the output of light source in the second wavelength range can again match the first non-linear wavelength function of the drive current, to which the spectrometer has been calibrated for the first scan, resulting in an accurate measurement also for the second scan. Alternately, the spectrometer can be additionally calibrated for the second set of laser spectrometer operating parameters. Thus, scanning across any particular wavelength range can be optimized by adjustment of one or more laser spectrometer operating parameters in order to maintain calibration fidelity of the spectrometer for more than one wavelength scan and/or more than one analyte absorption feature. Further examples of this optimization are presented in the discussions of FIGS. 4-6.

At 130, either during or upon completion of the first scanning and/or the second scanning, concentrations of the constituents can be determined from the spectroscopic data acquired during the scans. The determining can identify and/or quantify constituents and/or their concentrations within the sample gas. The determining can be based on the spectral features of the constituents as described above.

By measuring the spectral features over a given wavelength range, the amplitudes and widths of the spectral features can provide information needed to determine the presence and concentrations of one or more sample gas constituents. For example, strong absorption, as measured by the attenuation of light from the light source reaching the detector, can correspond to a large concentration of particular constituent. Also, the width of the spectral features can provide important information, such as the degree of collisional or thermal broadening. These effects can be used, for example, to determine important aspects of the constituents. For example, temperature, pressure, etc. can be factors that are used in collisional-radiative modeling or other models that can determine the amount of constituents from the received spectra.

Figure 2:
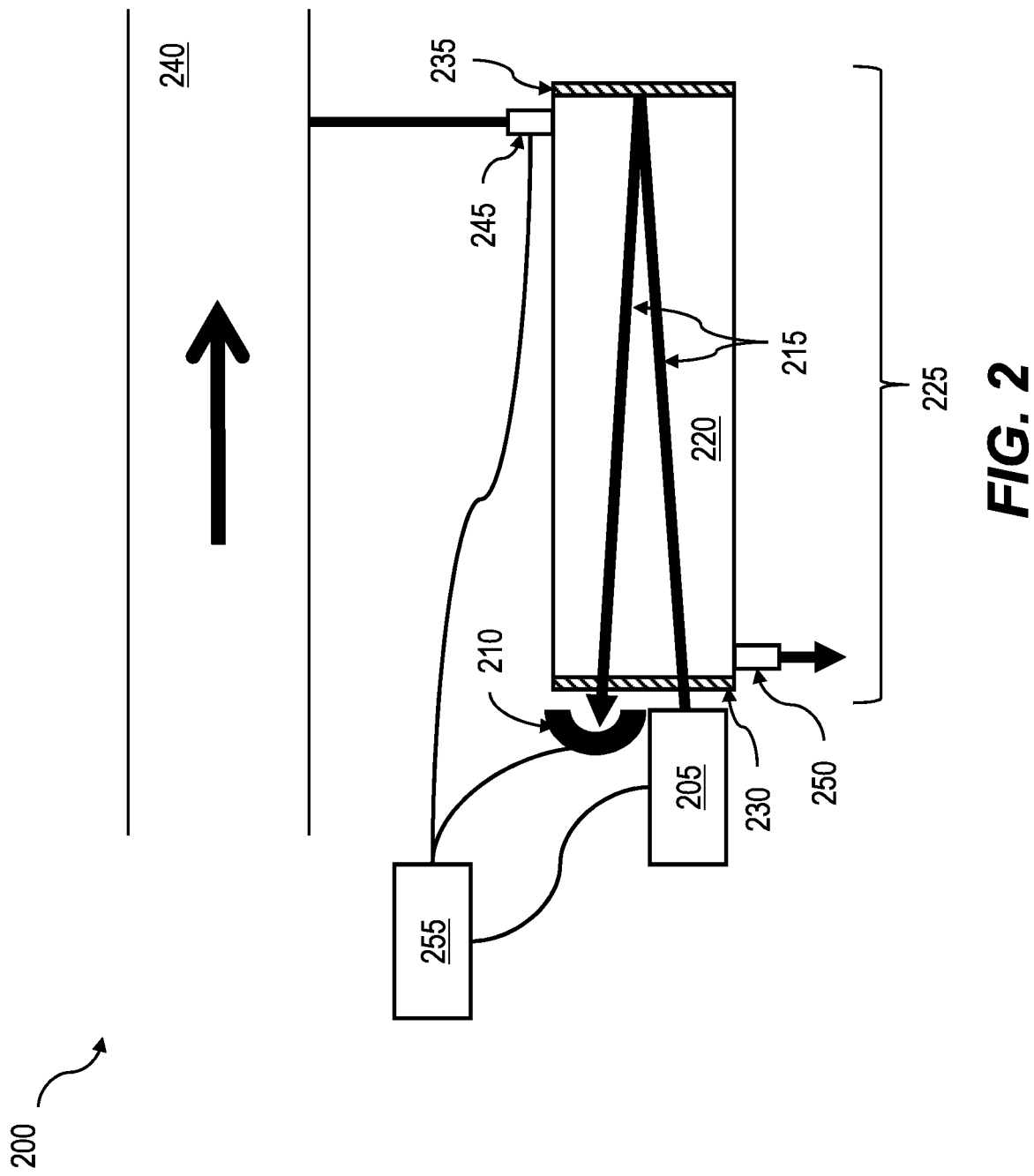
FIG. 2 is a diagram illustrating a closed path spectrometer with a sample cell.

FIG. 2 is a diagram 200 illustrating a first spectrometer with a sample cell. While the following is described in connection with detecting absorbing media within gas, it will be appreciated that the current subject matter can also be applied to detecting absorbing media within liquid. A light source 205 provides a continuous or pulsed light that is directed to a detector 210 via a path length 215. The light source 205 can include, for example, one or more of a tunable diode laser, a tunable semiconductor laser, a quantum cascade laser (QCL), an intra-band cascade laser (ICL), a vertical cavity surface emitting laser (VCSEL), a horizontal cavity surface emitting laser (HCSEL), a distributed feedback laser (DFB), and/or a distributed Bragg reflector laser (DBR).

The detector 210 can include, for example, one or more of an indium gallium arsenide (InGaAs) detector, an indium arsenide (InAs) detector, an indium phosphide (InP) detector, a silicon (Si) detector, a silicon germanium (SiGe) detector, a germanium (Ge) detector, a mercury cadmium telluride detector (HgCdTe or MCT), a lead sulfide (PbS) detector, a lead selenide (Pb Se) detector, a thermopile detector, a multi-element array detector, a single element detector, a photo-multiplier, a complementary metal oxide semiconductor (CMOS) detector, a charge coupled device (CCD) detector and the like.

The current subject matter can form part of a laser based spectroscopic analysis system such as: an absorption spectroscopic analysis system, a direct absorption spectroscopy (DAS) system, a wavelength modulation spectroscopy (WMS) system, a cavity enhanced spectroscopic (CES) analysis system, an optical feedback cavity enhanced absorption spectroscopic (OFCEAS) analysis system, a cavity ring-down spectroscopic (CRDS) analysis system, an integrated cavity output spectroscopic (ICOS) analysis system, a photoacoustic spectroscopic analysis system, and/or a Raman spectroscopic analysis system.

The path length 215 can traverse one or more volumes. In the example, systems 200 shown in FIG. 2, the path length 215 can twice traverse a volume 220 of an optical cell 225 that includes a window or other at least partially radiation transmissive surface 230 and a reflector (e.g., a mirror, etc.) 235 or other at least partially radiation reflective surface that at least partially defines the volume 220. Sample gas can, in some implementations, be obtained from a gas source, which in the examples of FIG. 2 is a pipeline 240, for delivery to the volume 220, for example via a sample extraction port or valve 245 that receives the sample gas from the source. Gas in the volume 220 can exit via a second outlet valve or port 250.

As illustrated in FIG. 2, in some variations, the volume 220 can be part of a housing that defines a sample cell that can be, for example, one or more of a Herriott Cell, an off-axis optical resonator, an on-axis optical resonator, an elliptical light collector, a White cell, a spheroidal cell, a non-Herriott longitudinal flow sample cell, an optical cavity, a hollow core light guide, a multiple pass configuration in which the light beam is reflected at least once, or a single pass configuration in which the light is not being reflected while the light traverses the sample cell.

The volume 220, containing a sample gas, can be maintained at a stable temperature and pressure. Alternatively, the volume 220 can include one or more temperature and/or pressure sensors to determine a current temperature and pressure within that volume for use in one or more calculations to compensate for temperature and/or pressure changes relative to a validation or calibration condition of the spectroscopic instrument. Furthermore, the volume 220 can be adjusted to preset temperature and pressure by heating elements and pressure control elements or mass flow control units. The sample gas can be at any pressure and/or temperature, for example, low pressures in the millitorr range, approximately atmospheric pressures, or up to any elevated venting pressures exceeding atmospheric pressure.

A control unit 255, which can include one or more programmable processors or the like, can communicate with one or more of the light source 205, the detector 210, and the reflector 235 for controlling the emission of the light 215 and receiving signals generated by the detector 210 that are representative of the intensity of light impinging on the detector 210 as a function of wavelength. In various implementations, the control unit 255 can be a single unit that performs both of controlling the light source 205 and receiving signals from the detector 210, or it can be more than one unit across which these functions are divided. For example, the control unit 255 can initiate and/or control the scanning described herein. Communications between the control unit 255 or control units and the light source 205 and detector 210 can be over wired communications links, wireless communications links, or any combination thereof. The control unit 255 can also, in some cases, be used to quantify an amount of absorbing media using the signal generated by the detector 210. In other variations, the quantification can be determined by at least one remote data processor.

The control unit 255, or alternatively one or more other processors that are either collocated with the other components or in wireless, wired, etc. communication therewith, can perform the processing functions discussed above in reference to the method illustrated in FIG. 1.

Figure 3:
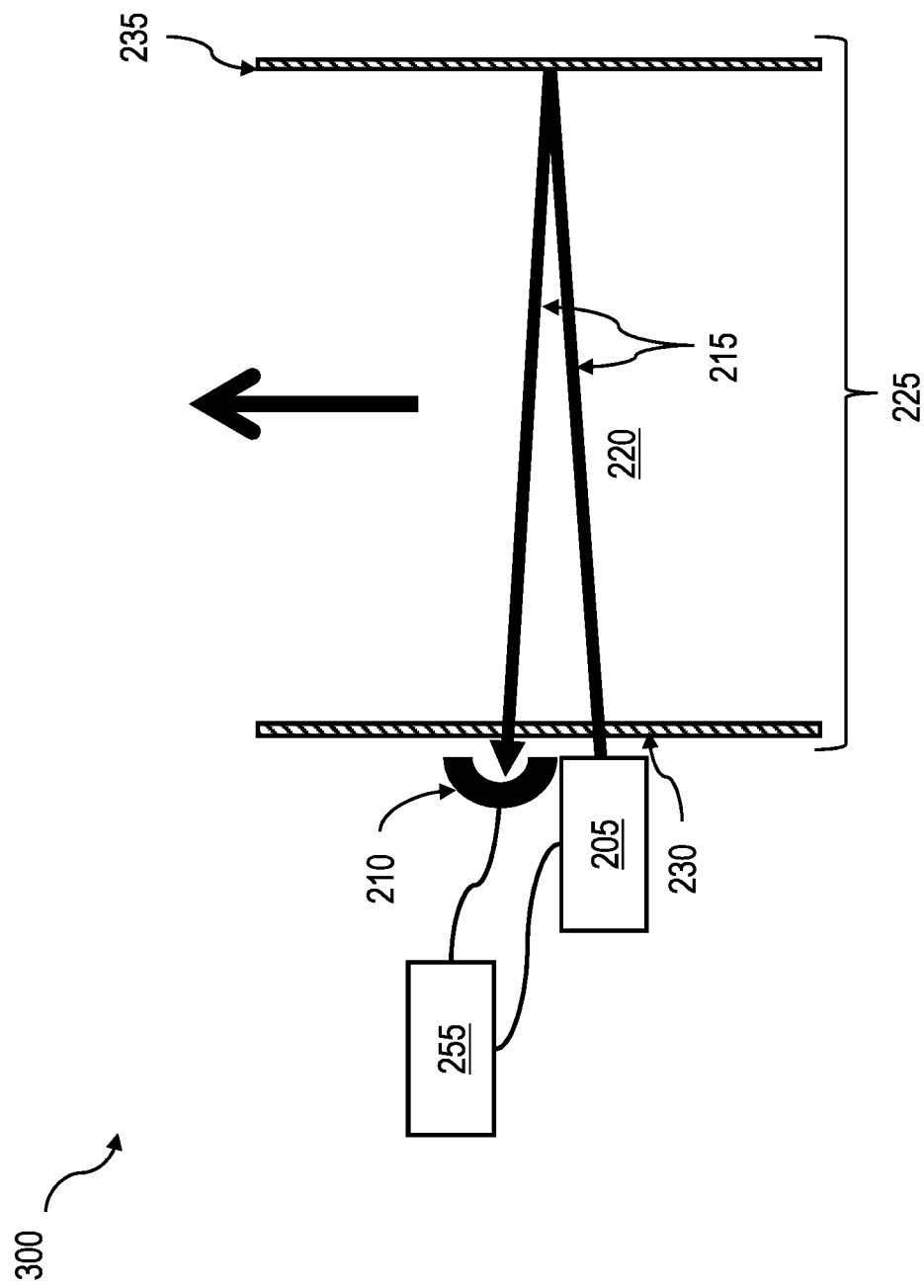
FIG. 3 is a diagram illustrating an open path spectrometer.

FIG. 3 is a diagram 300 illustrating an open path spectrometer. The components in an open path spectrometer can be similar in configuration and function to those shown in FIG. 2. As illustrated in FIG. 3, the volume 220 can be part of an open path system that does not include a dedicated sample cell. In the open path spectrometer of FIG. 3, the sample gas flows through the volume 220. The volume 220 can be traversed at least once by the beam from the light source 205 before reaching the detector 210. The open path spectrometer can then detect changes in the types and amounts of constituents as the sample gas flows through the volume 220. Open path systems can be used for various applications including atmospheric pollutant studies, fence line monitoring, process line/tank leak detection, industrial gas-purity applications, and monitoring and control of combustion processes, especially on exhaust stacks. Similar to the embodiment shown in FIG. 2, the control unit 255 can initiate and/or control the scanning performed in an open path spectrometer.

Figure 4:
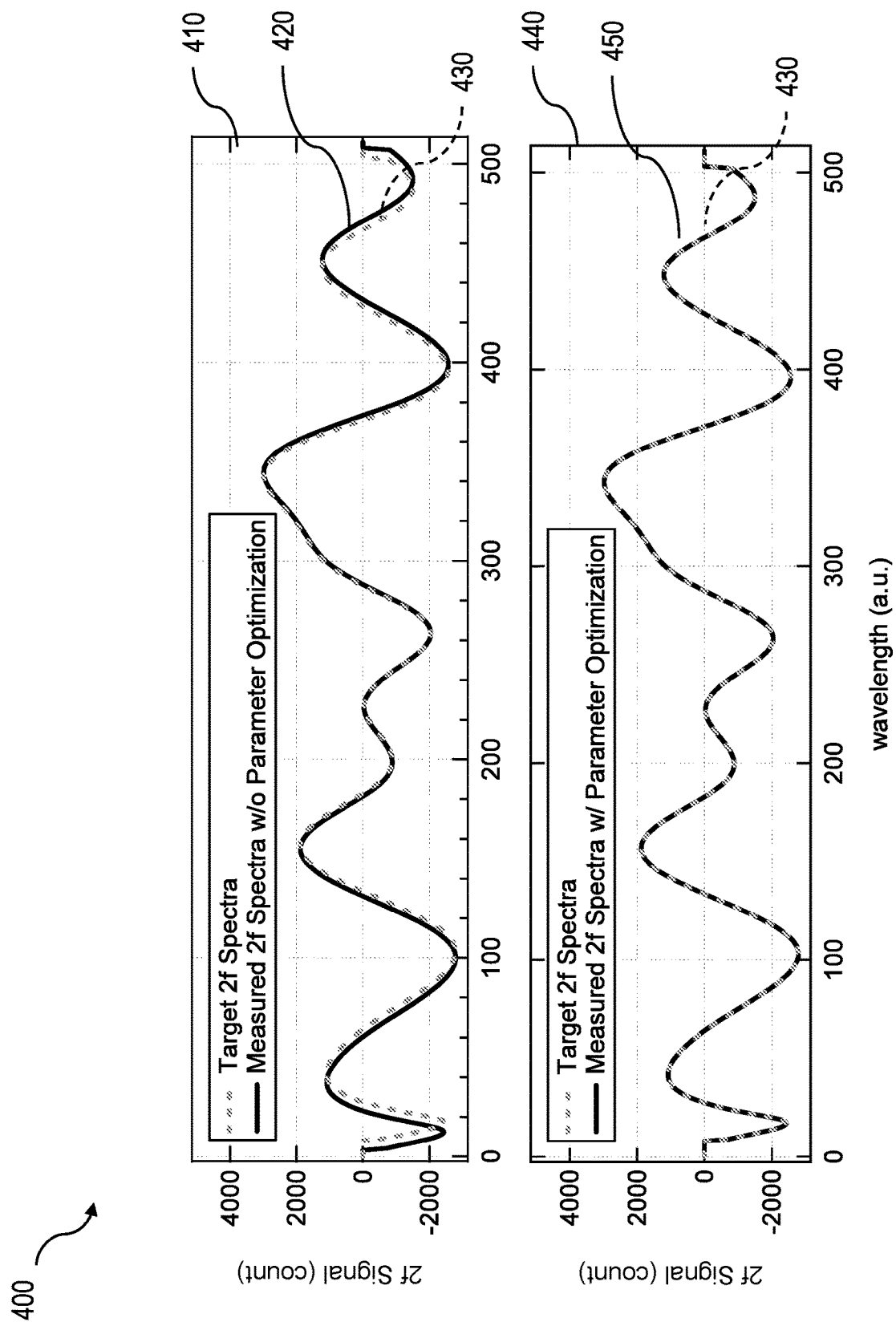
FIG. 4 is a diagram illustrating the correction of measured signals by optimizing the laser spectrometer operating parameters.

FIG. 4 is a diagram 400 illustrating the correction of measured signals by optimizing the laser spectrometer operating parameters. When scanning across a wide wavelength range, the wavelength of the light from the light source can deviate from an ideal linear response. Also, as previously discussed, other sources of error can arise independent of scanning range, for example, from aging of the laser or calibration drift. In one implementation, corrections for these effects that are needed when shifting from the first scanning range to the second, or vice versa, can be accomplished by independently optimizing the laser spectrometer operating parameters.

One example of a situation that can require correction is the introduction of nonlinear effects that can occur during a scan. To scan multiple analyte peaks with the light source 205, the wavelength (frequency) of the light source output can be varied. To vary or shift the wavelength of the light source, the temperature or drive current of the light source 205 can be adjusted. The adjusting of the temperature can be, for example, changing a set point on a temperature regulator that controls the temperature on one or more components of the light source, for example, a thermal electronic cooler, a fan and temperature sensor, a heater, liquid cooling of laser components, etc. However, adjusting the temperature or the drive current to shift the wavelength of the light source can create non-linear responses in the light source 205. For example, where the light source 205 is a semiconductor laser, to scan a wavelength range, the laser can first be centered at a particular wavelength and be operated at a particular temperature. By varying the current, such as the drive current or the modulation current, a wavelength range can be scanned around the center wavelength. However, resistive heating due to varying the currents in the laser itself changes the center wavelength of the laser. Such effects are inherently non-linear, and also functions of thermal response times due to temperature changes.

The top panel 410 in FIG. 4 illustrates one example of such non-linearities on a measured signal. A target absorption spectrum 430 (shown by the dashed curve) is shown where the wavelength of light from the light source is linear across the range of the target absorption spectrum 430. Such a spectrum can result in an accurate measurement of a particular analyte concentration. However, as a result of the non-linear effects described above, the measured absorption spectrum 420 can be compressed or expanded in wavelength as compared to the target absorption spectrum 430. One example of this is shown by the measured absorption spectrum 420 featuring an expansion in wavelength. Such a spectral compression or expansion can ultimately result in an incorrect reading of the measured analyte concentration.

To correct for these effects, the laser spectrometer operating parameters can be independently adjusted as discussed with reference to FIG. 1 and further discussed below. The result of such corrections is shown in the bottom panel 440 of FIG. 4, where the measured spectrum 450 closely matches the target spectrum 430, and provides a correct reading of the measured analyte concentration.

In addition, a further enhancement of any of the techniques described herein can be made by applying, based on pre-defined calibration data, a correction to at least one set of laser spectrometer operating parameters to accommodate laser drift, change of laser tuning rate, and/or temperature tuning rate. The pre-defined calibration data can be any data that describes the response of the spectrometer when measured against known sources, or against tabulated quantities. Corrections can include offsets to laser spectrometer operating parameters, application of a correction curve for correction values that vary depending on the instant setting of the laser spectrometer operating parameter, etc. The corrections can be stored in the control unit 255 or accessed remotely. As part of the laser spectrometer operating parameter optimizations described herein, the spectrometer can be calibrated to measure a particular constituent or a particular spectral feature of a constituent for a given pressure and temperature. There can be multiple calibrations, each corresponding to the constituent having a particular pressure and temperature. Similarly, there can be additional calibrations for any number of constituents. The calibrations can include a set of values for the laser spectrometer operating parameters and/or other features of the light source and/or detector.

Figure 5:
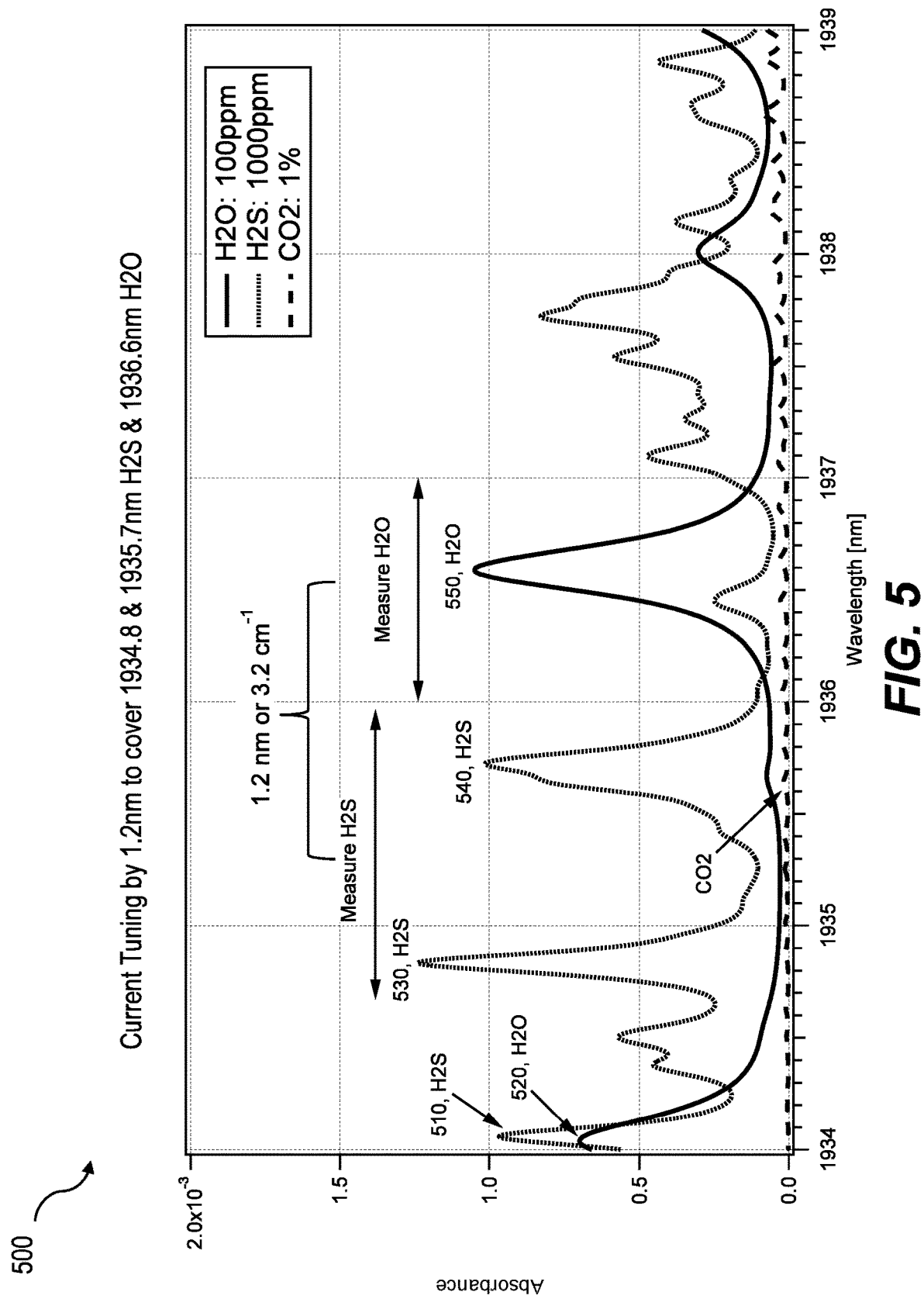
FIG. 5 is a diagram illustrating detection of two constituents with current tuning of a laser light source.
Figure 6:
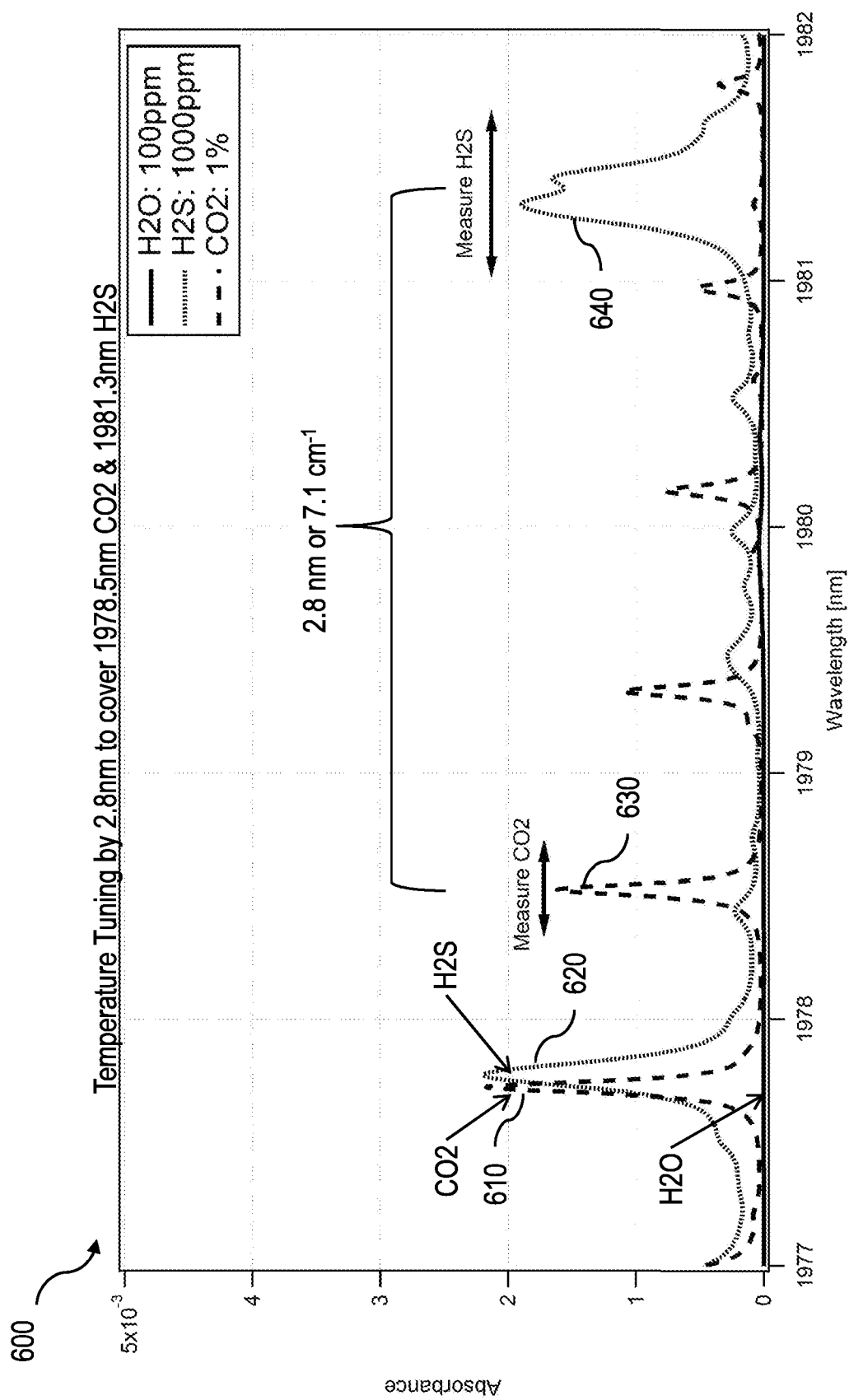
FIG. 6 is a diagram illustrating detection of two constituents with temperature tuning of a laser light source.

FIGS. 5-6 illustrate different implementations incorporating tuning of the laser 205 to optimally measure multiple spectral features corresponding to multiple constituents. FIG. 5 is a diagram 500 illustrating detection of two constituents with current tuning of a laser 205. In particular, concentrations of $H_2S$ and $H_2O$ in a sample gas can, for example, be determined by scanning a first 1.3 nm wavelength range then scanning a second 1.0 nm wavelength range respectively by tuning the drive current of the laser 205. In this example, spectral features of interest sometimes overlap to an extent that accurate determination of both constituent concentrations are difficult or impossible. This phenomenon can be seen by the $H_2S$ absorption peak 510 and the $H_2O$ absorption peak 520 at the far left side of FIG. 5. Here, the absorption peaks are overlapping, and therefore no measurement of their concentrations can reasonably be inferred from such overlapped absorption peaks. However, by tuning the drive current of the laser 205 to scan the first wavelength range shown in FIG. 5, $H_2S$ absorption peaks 530 & 540 distinct from an $H_2O$ absorption peak 550 can be detected by the spectrometer. This is shown by the three absorption peaks (530 at 1934.8 nm, 540 at 1935.7 nm and 550 at 1936.6 nm) where particular spectral features corresponding to $H_2S$ and $H_2O$ can be measured without interference from the other gas constituents. $CO_2$, another constituent of interest, is also present but does not have any significant absorption peaks in either the first wavelength range or the second wavelength range. In one implementation, the definition of separate absorption peaks can be where the first wavelength range and the second wavelength range at least encompass the full-width, half-maximum (FWHM) of the corresponding absorption peak. Examples of the first wavelength range and the second wavelength range, here wider than the FWHM, are shown by the double-arrows in FIG. 5.

While a wide spectrum is shown in FIG. 5 for illustrative purposes, in some implementations, the wavelength ranges, for example the first wavelength range and/or the second wavelength range, can vary in size. For example, the widths of each of the first wavelength range and the second wavelength range can span one of approximately 1-10 times or 11-100 times or 1-1000 times of the FWHM (full width at half maximum) of a measured spectral feature. It will be appreciated that the wavelength span ranges cited will increase or decrease in accordance with increasing or decreasing wavelengths, increasing from the discussed approximately 1935 nm, in the near infrared spectral range, to measurements at wavelengths longer than 1935 nm and decreasing for measurements at wavelengths shorter than the discussed approximately 1935 nm. Also, knowing the wavelengths where the absorption peaks are, a wavelength tuning need only include a peak-to-peak range in order to measure the height and width of two spectral features. The FWHM of absorption features of most molecules at 1 atmosphere and at ambient temperature of 300K is approximately 0.1-0.3 wavenumbers (<0.5 cm-1). In the example of FIG. 5, scanning from the $H_2S$ absorption peaks 530 & 540 to the $H_2O$ absorption peak 550 may only require tuning the light source over a 0.9 nm wavelength range. It should be appreciated that the conversion from the spectral wavelength unit of nm to the frequency unit of wavenumbers is $cm^{-1}=1 e^7/nm$.

In one implementation, the first scanning and the second scanning can include adjusting at least one of the laser spectrometer operating parameters of the light source 205 while maintaining a constant temperature of the light source 205. In another implementation, there can be a first temperature of the light source during the first scanning and a second temperature of the light source during the second scanning. In this implementation, the first temperature and the second temperature can be different. Various techniques can be used when adjusting the laser spectrometer operating parameters. For example, adjusting, during the first scanning and/or the second scanning, a drive current ramp rate, randomly within a maximum ramp rate and a minimum ramp rate. The selection of the ramp rates can be determined purely randomly, varying from measurement to measurement, or pseudo-randomly, where the random ramp rates are based on the same seed to provide a reproducible, but still "random" sequence of ramp rates.

FIG. 6 is a diagram 600 illustrating detection of two constituents with temperature tuning of a light source 205. Similar to adjusting the drive current as shown in FIG. 5, the wavelength of the light source 205 can also be modified by adjusting the temperature of the light source 205. Again, any of the laser spectrometer operating parameters can be varied independently in order to optimize the response of the light source during the first scanning and/or the second scanning. An example of this is illustrated in FIG. 6 where both $CO_2$ and $H_2S$ are measured. While $CO_2$ has the strongest absorption peak 610 at approximately 1977.7 nm, it is overlapped by an $H_2S$ absorption peak 620. The next strongest $CO_2$ absorption peak 630 that is not overlapped is at approximately 1978.5 nm. There is also an isolated $H_2S$ absorption peak 640 at approximately 1981.3 nm. By adjusting the temperature of the light source 205 over, for example, the highlighted 2.8 nm range, both $CO_2$ and $H_2S$ can be measured.

Figure 7:
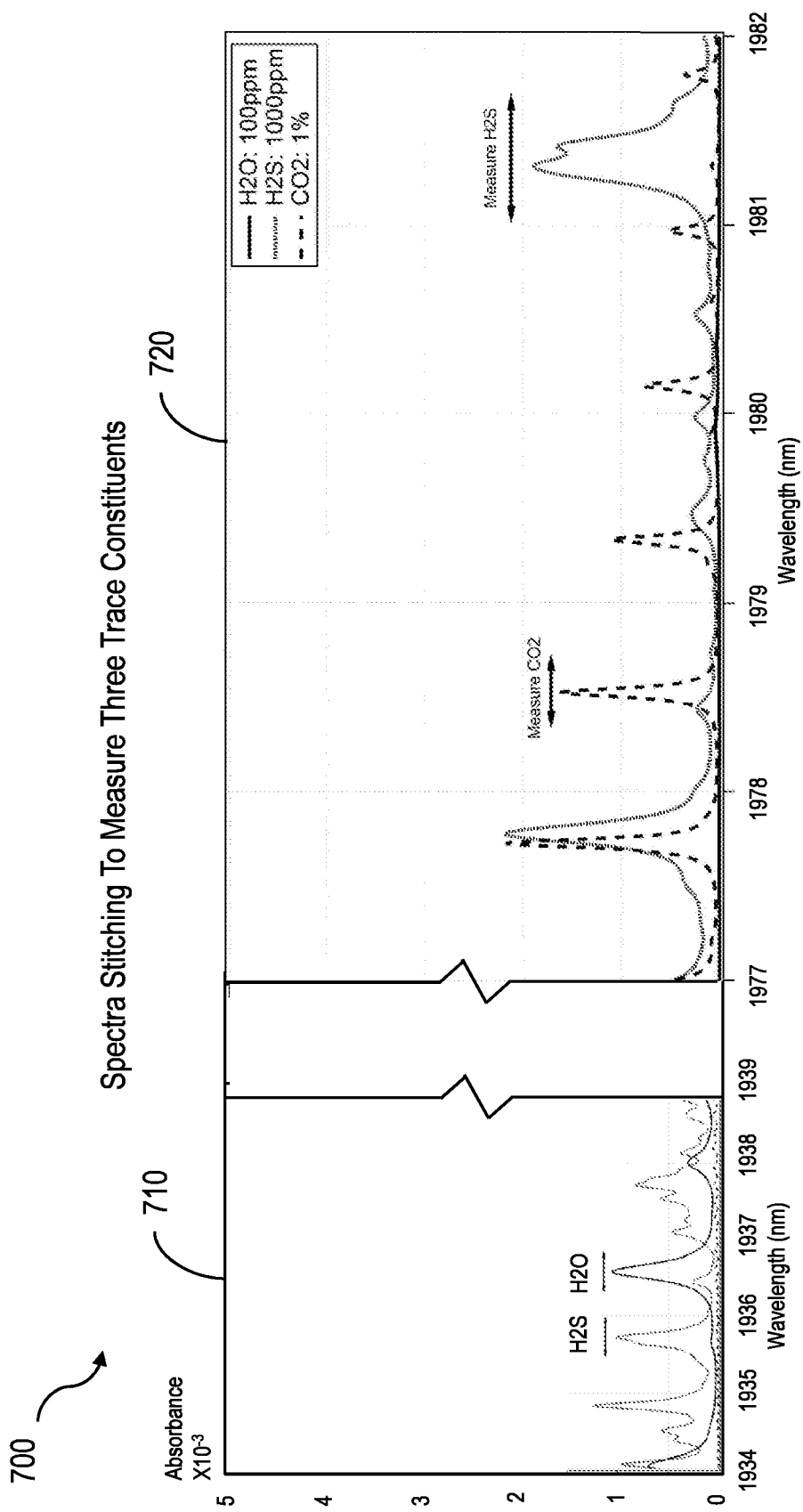
FIG. 7 is a diagram illustrating the stitching of two spectra by combining current tuning with temperature tuning.

FIG. 7 is a diagram 700 illustrating the stitching of two spectra by combining current tuning with temperature tuning. The spectral features of multiple constituents can be widely separated in wavelength. Generating a continuous spectrum that includes all desired spectral features can require using different methods of parameter optimization. For example, the methods illustrated in FIG. 5 and FIG. 6 can be combined, and accordingly allow determination of concentrations of three constituents. The continuous spectrum can encompass at least a first absorption peak corresponding to a first constituent and a second absorption peak corresponding to a second constituent, as well as a third absorption peak corresponding to a third constituent. The continuous spectrum can be obtained by adjusting at least one of a drive current, a modulation current, a ramp current, a signal detection gain and/or a phase, or a temperature of the light source 205 during at least one of the first scanning and/or the at least one second scanning.

In the example of FIG. 7, there are three constituents that can be measured by combining the above techniques. The plot 710 to the left of the break lines shows the spectrum measured in FIG. 5, where concentrations of $H_2S$ and $H_2O$ can be determined. The plot 720 to the right of the break lines shows the spectrum measured in FIG. 6 where the concentration of $CO_2$ can be determined. In this example, by adjusting both current and temperature of the light source 205, the concentrations of all three constituents can be measured in a single wide scan without having to change hardware components.

Figure 8:
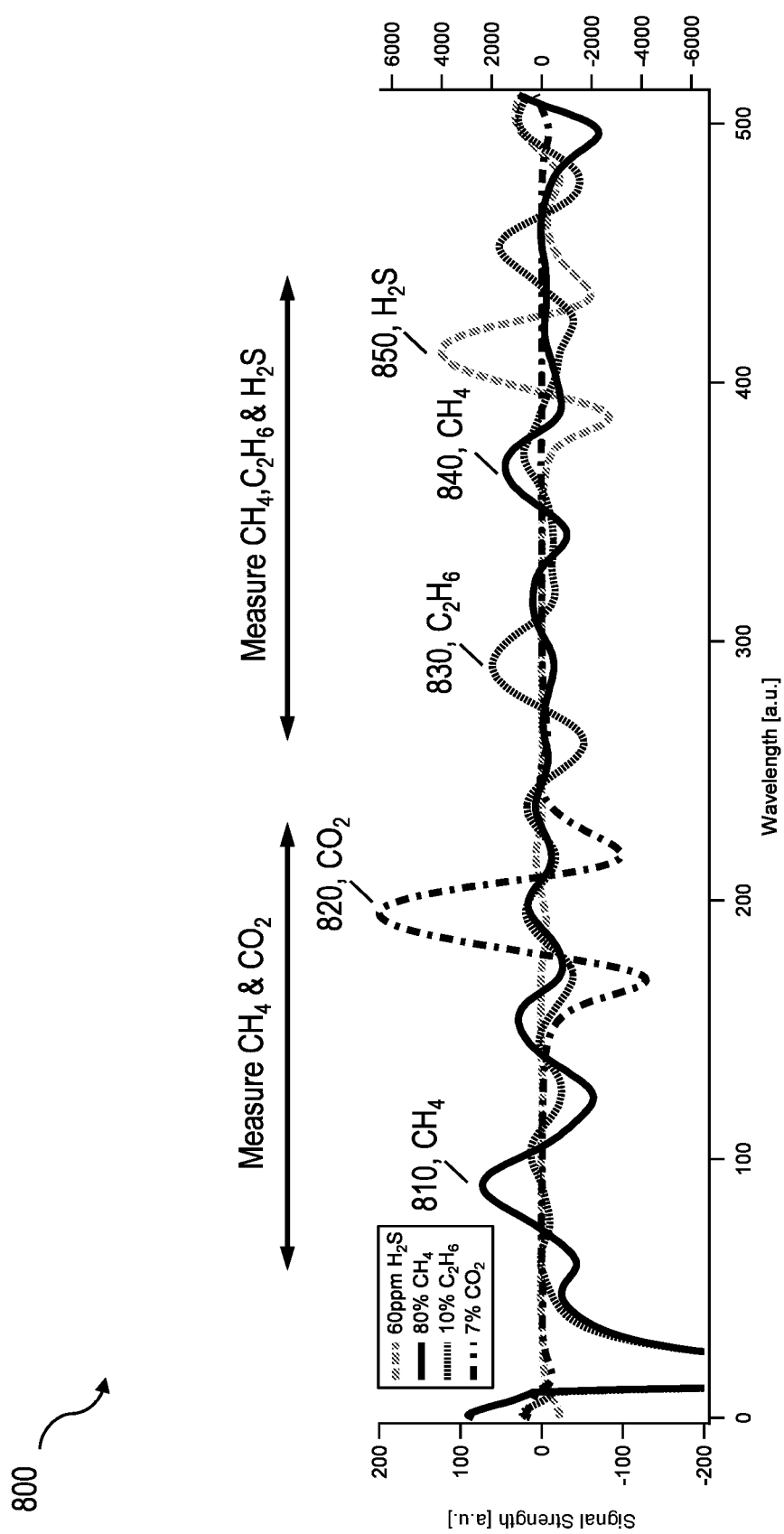
FIG. 8 is a diagram illustrating detection of multiple spectral features corresponding to multiple constituents.

FIGS. 5-7 show examples where each scanning wavelength range has one or more dominant spectral features corresponding to only a single sample gas constituent. In other implementations, each one or more of the scanning wavelength range (the first, the second, or the other) can have multiple spectral features corresponding to multiple sample gas constituents. The spectral feature for each constituent is distinguishable from each other even if they partially overlap. FIG. 8 shows such an example in a WMS system, where the first wavelength range contains spectral features from 80% $CH_4$ (peak 810) and 7% $CO_2$ (peak 820) respectively, and the second wavelength range contains spectral features from 10% $C_2H_6$ (peak 830), 80% $CH_4$ (peak 840) and 60 ppm $H_2S$ (peak 850). With current tuning of a laser 205 to scan two separate wavelength ranges, each of which covers spectral features corresponding to multiple constituents, the concentrations of $H_2S$ (ppm), $CO_2$ (0-20%), $CH_4$ (50-100%) & $C_2H_6$ (0-20%) in one natural gas stream can be simultaneously measured with one single spectrometer. The measured concentrations of $CO_2$, $CH_4$ & $C_2H_6$ can be used to correct the collisional broadening and partial spectral overlapping influences on $H_2S$ measurement, further improving the trace $H_2S$ measurement accuracy.

Furthermore, the determination of multiple constituents can be used in an iterative manner to improve the accuracy of the measurement. The constituents can interact with each other, such as by molecular collisions, which result in collisional broadening of the measured spectra. For example, a measurement of a concentration can be made for a first constituent by measuring and analyzing a first spectral feature as described above. This can involve making assumptions in the modelling of concentrations of other constituents, such as when estimating the effects of collisional broadening. When the second constituent is measured, instead of using an estimate of the concentration of the first constituent, the above measurement of the first constituent can be used instead. With the measurement for the second constituent in hand, the analysis of the first constituent can be repeated, now using the measured concentration of the second constituent instead of the original estimate. This iterative process can continue until the results converge to an approximate final value. This process can also be used for an arbitrary number of constituents being measured.

Automatic compensation of collisional broadening offsets from changing background stream compositions can be performed as a result of constant detection of the multiple constituents. In addition to the iterative method described above, multi-variate regression models can be used to correct for differences between calibration data and measured data. Such models are discussed in greater detail in U.S. Patent Application Publication No. 2016/0132617 to Xiang Liu et al., the contents of which are hereby incorporated by reference.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by a spectrometer comprising a laser light source, a control unit, and at least one detector positioned such that light emitted by the laser light source is detected by the at least one detector after passing through a sample gas, the method comprising:
   first scanning, by the control unit using a first set of laser spectrometer operating parameters, a first wavelength range by adjusting a wavelength of light of a beam emitted by the laser light source and passing through the sample gas, the first wavelength range encompassing a first spectral feature corresponding to a first constituent;
   at least one second scanning, upon completion of the first scanning and by the control unit using a second set of laser spectrometer operating parameters at least partially different from the first set of laser spectrometer operating parameters, a second wavelength range by adjusting the wavelength of light emitted from the laser light source and passing through the sample gas, the second wavelength range having a second spectral feature corresponding to at least one second constituent;
   adjusting at least one operating parameter between the first scanning and the second scanning to separate an overlap of spectral peaks; and
   determining, by the control unit, based on both of the first scanning and the second scanning, a first concentration of the first constituent and a second concentration of the at least one second constituent.

2. The method of claim 1, wherein the first set of laser spectrometer operating parameters and/or the second set of laser spectrometer operating parameters are at least one of: a drive current, a modulation current, a ramp current, an intensity, a signal detection gain and/or a phase.

3. The method of claim 1, wherein a temperature of the laser light source is the same in both the first scanning and the at least one second scanning.

4. The method of claim 1, wherein a first temperature of the laser light source during the first scanning is different than a second temperature of the laser light source during the at least one second scanning.

5. The method of claim 1, wherein the first wavelength range partially overlaps the second wavelength range.

6. The method of claim 1, wherein the first wavelength range does not overlap the second wavelength range.

7. The method of claim 1, wherein the first wavelength range and/or the at least one second wavelength range includes multiple spectral features corresponding to the first constituent and/or the at least one second constituent, wherein the multiple spectral features for each of the first constituent and/or the at least one second constituent are distinguishable from each other.

8. The method of claim 1, further comprising: generating a spectrum encompassing at least the first spectral feature and the second spectral feature, the spectrum obtained by adjusting at least one of: a drive current, a modulation current, a ramp current, an intensity a signal detection gain and/or a phase, or a temperature of the laser light source during at least one of the first scanning or the at least one second scanning.

9. The method of claim 1, further comprising: applying, based on pre-defined calibration data, a correction to at least one set of laser spectrometer operating parameters to accommodate wavelength drift, change of current tuning rate, and/or temperature tuning rate of the laser light source.

10. The method of claim 1, wherein a scanning range of each of the first wavelength range and the second wavelength range span 1-10 times or 1-100 times or 1-1000 times of a full-width half-maximum of a spectral feature.

11. The method of claim 1, further comprising: adjusting during the first scanning and/or the second scanning, any of a drive current ramp rate, a signal gain, a detection phase, and a signal intensity, within a minimum value and maximum value.

12. The method of claim 1, wherein the first wavelength range at least encompasses a full-width half-maximum of the first spectral feature and the second wavelength range at least encompasses a full-width half-maximum of the second spectral feature.

13. The method of claim 1, wherein the laser light source comprises at least one of:
a tunable diode laser, a tunable semiconductor laser, a tunable solid state laser, a quantum cascade laser (QCL), an intra-band cascade laser (ICL), a vertical cavity surface emitting laser (VCSEL), a horizontal cavity surface emitting laser (HCSEL), a distributed feedback laser (DFB), a distributed Bragg reflector laser (DBR).

14. The method of claim 1, wherein the at least one detector comprises at least one of an indium gallium arsenide (InGaAs) detector, an indium arsenide (InAs) detector, an indium phosphide (InP) detector, a silicon (Si) detector, a silicon germanium (SiGe) detector, a germanium (Ge) detector, a mercury cadmium telluride detector (HgCdTe or MCT), a lead sulfide (PbS) detector, a lead selenide (Pb Se) detector, a thermopile detector, a multi-element array detector, a single element detector, a CMOS (complementary metal oxide semiconductor) detector, a CCD (charge coupled device detector) detector, or a photomultiplier.

15. The method of claim 1, wherein a housing defines a sample cell that comprises at least one of a Herriott Cell, an off-axis optical resonator, an on-axis optical resonator, an elliptical light collector, a White cell, a spheroidal cell, a non-Herriott longitudinal flow sample call, an optical cavity, a hollow core light guide, a multiple pass configuration in which the light beam is reflected at least once, or a single pass configuration in which the light is not being reflected while the light traverses the sample cell.

16. The method of claim 1, wherein the sample gas is in a sample volume forming part of an open path system.

17. The method of claim 1, further comprising:
calculating, based on the first scanning and/or the second scanning, the first concentration based in part on the spectral feature of the first constituent and the second concentration of the at least one second constituent of the sample gas.

18. A spectrometer comprising:
a laser light source;
a control unit; and
at least one detector positioned such that light emitted by the laser light source is detected by the at least one detector after passing through a sample gas, the control unit causing:
first scanning, by the control unit using a first set of laser spectrometer operating parameters, a first wavelength range by adjusting a wavelength of light of a beam emitted by the laser light source and passing through the sample gas, the first wavelength range encompassing a first spectral feature corresponding to a first constituent;
at least one second scanning, upon completion of the first scanning and by the control unit using a second set of laser spectrometer operating parameters at least partially different from the first set of laser spectrometer operating parameters, a second wavelength range by adjusting the wavelength of light emitted from the laser light source and passing through the sample gas, the second wavelength range having a second spectral feature corresponding to at least one second constituent;
adjusting at least one operating parameter between the first scanning and the second scanning to separate an overlap of spectral peaks; and
determining, by the control unit, based on both of the first scanning and the at least one second scanning, a first concentration of the first constituent and a second concentration of the at least one second constituent.

19. A non-transitory computer program product storing instructions which, when executed by at least one data processor forming part of a control unit controlling at least one of a laser light source and at least one detector positioned such that light emitted by the laser light source is detected by the at least one detector after passing through a sample gas, result in the control unit executing operations comprising:
first scanning, by the control unit using a first set of laser spectrometer operating parameters, a first wavelength range by adjusting a wavelength of light of a beam emitted by the laser light source and passing through the sample gas, the first wavelength range encompassing a first spectral feature corresponding to a first constituent;
at least one second scanning, upon completion of the first scanning and by the control unit using a second set of laser spectrometer operating parameters at least partially different from the first set of laser spectrometer operating parameters but with a temperature of the laser light source being the same in both the first scanning and the at least one second scanning, a second wavelength range by adjusting the wavelength of light emitted from the laser light source and passing through the sample gas, the second wavelength range having a second spectral feature corresponding to at least one second constituent;

adjusting at least one operating parameter between the first scanning and the second scanning to separate an overlap of spectral peaks; and determining, by the control unit, based on both of the first scanning and the at least one second scanning, a first concentration of the first constituent and a second concentration of the at least one second constituent.

20. The computer program product of claim 19, wherein the first set of laser spectrometer operating parameters and/or the second set of laser spectrometer operating parameters are at least one of: a drive current, a modulation current, a ramp current, a signal detection gain and/or phase.

21. The computer program product of claim 19, further comprising:

calculating, based on the first scanning and/or the second scanning, the first concentration based in part on the spectral feature of the first constituent and the second concentration based in part on the spectral feature of the at least one second constituent of the sample gas.

* * * * *